(12) United States Patent
Agapi et al.

(10) Patent No.: US 8,661,411 B2
(45) Date of Patent: Feb. 25, 2014

(54) METHOD AND SYSTEM FOR TESTING SECTIONS OF LARGE SPEECH APPLICATIONS

(75) Inventors: Ciprian Agapi, Lake Worth, FL (US); Brent D. Metz, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 2137 days.

(21) Appl. No.: 11/292,833

(22) Filed: Dec. 2, 2005

(65) Prior Publication Data

US 2007/0129947 A1   Jun. 7, 2007

(51) Int. Cl.
*G06F 9/44* (2006.01)
*G10L 15/00* (2013.01)
*G10L 25/00* (2013.01)

(52) U.S. Cl.
USPC ........... 717/124; 717/104; 717/120; 717/125; 717/126; 704/257; 704/270

(58) Field of Classification Search
None
See application file for complete search history.

(56) References Cited

U.S. PATENT DOCUMENTS

| | | | |
|---|---|---|---|
| 5,144,671 A * | 9/1992 | Mazor et al. | 704/220 |
| 5,414,836 A * | 5/1995 | Baer et al. | 714/38 |
| 5,715,369 A | 2/1998 | Spoltman et al. | |
| 5,930,753 A | 7/1999 | Potamianos et al. | |
| 6,002,869 A * | 12/1999 | Hinckley | 717/124 |
| 6,167,547 A * | 12/2000 | Senechal et al. | 714/732 |
| 6,223,306 B1 * | 4/2001 | Silva et al. | 714/37 |
| 6,516,051 B2 * | 2/2003 | Sanders | 379/10.03 |
| 6,701,295 B2 | 3/2004 | Beutnagel et al. | |
| 6,775,824 B1 * | 8/2004 | Osborne et al. | 717/125 |
| 6,804,796 B2 * | 10/2004 | Gustavsson et al. | 714/38 |
| 6,810,111 B1 * | 10/2004 | Hunter et al. | 379/1.02 |
| 6,948,152 B2 * | 9/2005 | Dubovsky | 717/124 |
| 7,140,004 B1 * | 11/2006 | Kunins et al. | 717/125 |
| 7,224,776 B2 * | 5/2007 | Creamer et al. | 379/88.18 |
| 7,263,173 B2 * | 8/2007 | Cline et al. | 379/1.02 |
| 7,308,079 B2 * | 12/2007 | Creamer et al. | 379/27.04 |
| 7,539,287 B2 * | 5/2009 | Hunter et al. | 379/1.02 |

(Continued)

OTHER PUBLICATIONS

Nicole Yankelovich et al., "SpeechActs: A Framework for Building Speech Applications", [Online], 1994, pp. 1-10 [Retrieved from Internet on Nov. 29, 2013], <http://citeseerx.ist.psu.edu/viewdoc/download?doi=10.1.1.65.3138&rep=rep1&type=pdf>.*

Debasish Kundu et al., "Automatic code generation from unified modeling language sequence diagrams", [Online], 2013, pp. 12-28, [Retrieved from Internet on Nov. 29, 2013], <http://ieeexplore.ieee.org/stamp/stamp.jsp?tp=&arnumber=6471306>.*

(Continued)

*Primary Examiner* — Thuy Dao
*Assistant Examiner* — Ziaul A Chowdhury
(74) *Attorney, Agent, or Firm* — Wolf, Greenfield & Sacks, P.C.

(57) ABSTRACT

A method and system for testing code within a speech application. A test file can be automatically generated to verify the functionality of a new section of code within a graphical call flow builder application. A user can specify through a wizard two points on a path identifying the code section to be tested. The wizard can generate a test file and configure a path to a new subpath. Values are assigned to graphical call flow prompts along the path. Thus, the new code section is reached under the same path conditions for allowing repeatable testing. The system can include a test harness to test a new code section from within a context of the speech application, and a test controller for transitioning to the new code section. The test controller can run the test harness within the speech application to evaluate a functionality of the new code section.

12 Claims, 5 Drawing Sheets

(56) References Cited

U.S. PATENT DOCUMENTS

| | | | |
|---|---|---|---|
| 7,558,731 B1* | 7/2009 | Hodjat et al. | 704/257 |
| 7,562,347 B2* | 7/2009 | Baumgart et al. | 717/120 |
| 7,603,433 B1* | 10/2009 | Paterik | 709/217 |
| 7,643,998 B2* | 1/2010 | Yuen et al. | 704/275 |
| 7,657,872 B2* | 2/2010 | Kelbaugh et al. | 717/124 |
| 7,698,136 B1* | 4/2010 | Nguyen et al. | 704/241 |
| 8,260,617 B2* | 9/2012 | Dhanakshirur et al. | 704/270 |
| 8,453,106 B2* | 5/2013 | DeLine et al. | 717/104 |
| 2002/0032564 A1* | 3/2002 | Ehsani et al. | 704/235 |
| 2003/0084429 A1* | 5/2003 | Schaefer | 717/125 |
| 2003/0204833 A1* | 10/2003 | Pokhariyal | 717/106 |
| 2003/0212561 A1* | 11/2003 | Williams et al. | 704/270.1 |
| 2004/0225499 A1* | 11/2004 | Wang et al. | 704/257 |
| 2005/0036594 A1* | 2/2005 | Hunter et al. | 379/88.18 |
| 2005/0119892 A1* | 6/2005 | Agapi et al. | 704/270 |
| 2005/0129194 A1* | 6/2005 | Creamer et al. | 379/88.18 |
| 2005/0188262 A1* | 8/2005 | Rosenman et al. | 714/25 |
| 2005/0235255 A1* | 10/2005 | Agapi et al. | 717/106 |
| 2005/0256665 A1* | 11/2005 | Hartmann et al. | 702/121 |
| 2006/0195817 A1* | 8/2006 | Moon | 717/104 |
| 2007/0168973 A1* | 7/2007 | Crihfield | 717/124 |

OTHER PUBLICATIONS

Neil Patel et al., "A Comparative Study of Speech and Dialed Input Voice Interfaces in Rural India", [Online], Apr. 2009, pp. 51-59, [Retrieved from Internet on Nov. 29, 2013], <http://gsct3237.kaist.ac.kr/e-lib/Conferences/CHI/2009/docs/p51.pdf>.*

Alexander Schmitt et al., "On NoMatchs, NoInputs and Bargelns:Do Non-Acoustics Features Support Anger Detection?", [Online], 2009, pp. 128-131, [Retrieved from Internet on Nov. 29, 2013], <http://www.newdesign.aclweb.org/anthology-new/W/W09/W09-3918.pdf>.*

Godefroid, P., et al., "Automated Systematic Testing for Constraint-Based Interactive Services", SIGSOFT, pp. 40-49, Nov. 2000.

Stevenson, M., et al., "The Interaction of Knowledge Sources in Word Sense Disambiguation", Assoc. for Computational Linguistics, 2001.

McTear, M.F., "Spoken Dialogue Technology: Enabling the Conversational User Interface", ACM Computing Surveys, vol. 34, No. 1, pp. 90-169, Mar. 2002.

Oard, D.W., et al., "Building an Information Retrieval Test Collection for Spontaneous Conversational Speech", SIGIR '04, pp. 41-48, Jul. 25-29, 2004.

* cited by examiner

METHOD AND SYSTEM FOR TESTING SECTIONS OF LARGE SPEECH APPLICATIONS

BACKGROUND OF THE INVENTION

1. Technical Field

This invention relates to the field of speech processing, and more particularly, to testing speech processing applications.

2. Description of the Related Art

Speech processing applications are becoming common for modern interactive services, allowing people to more easily communicate with computers and machines. For example, dialogue management systems facilitate the transfer of information through natural language speaking. Interactive Voice Response systems enable users to connect or route calls to service destinations. Natural language understanding systems allow users to converse with computers for receiving information. As interactive voice services expand to provide more voice enabling features and options, the level of application development grows more complex. Consequently, large scale speech applications can require significant training and testing to provide acceptable performance.

Developers commonly introduce new features to improve or expand the performance of a speech application. The new features can require significant testing before releasing the application to the public. Generally, the developer tests the structural aspects of a speech application as well as the voice recognition and interpretation abilities of the application during development. The testing can include evaluating the entire set of possible outcomes of the speech application. The developer can be burdened with the numerous permutations of testing conditions to evaluate the functionality, quality, or experience of a new feature. The act of testing sections of large speech applications at development time can be time consuming given the level of complexity expected in modern speech applications. Considerable time can be spent testing a new functionality added by a developer, or by a team mate.

In practice, developers build new features on top of existing features for providing new functionality on top of existing functionality. As the speech application grows so too does the call depth to the underlying code sections. New features generally introduce new code on top of existing code which increases the call stack. Accessing the new code can begin at the bottom of the call stack and build up to the new code to satisfy a set of constraints on the existing code. For example, an IVR speech application can resemble a call flow tree with branches that expand outward as new features are added. The branches can represent new avenues for routing, or servicing, a call, thereby introducing more options for the caller to encounter and more options for the developer to test. Reaching a branch can require following a path along any supporting branches while satisfying a set of prior conditions along the path. Also, the branches can interconnect amongst one another leading to an expanded set of possible outcomes, where reaching each branch depends on conditions set by previous branches. Accordingly, each new branch introduces a new set of test conditions along a path which can lead to a more comprehensive testing responsibility.

In general, new code is developed at an increased depth of the call flow tree, or stack, and accessing the new code can require satisfying all conditions along a branch path prior to the new code. For example, to access a new branch, it may be necessary to climb along a path of existing branches satisfying their constraints. Accordingly, reaching a new section of code can require following an entire path to the branch that supports the new code while satisfying all conditions for branches along the path to the new code. A need therefore exists for providing a testing environment to developers which automates testing of new code sections and reduces their test time involvement.

SUMMARY OF THE INVENTION

Embodiments in accordance with the invention can include a new method and system for testing a new section of a speech application. The method and system can automatically generate a test file that will functionally verify the new section presented within a Graphical Call Flow Builder (which is a speech based integrated development environment). The method can include the steps of detecting a new code section, and configuring a path to the new code section. The step of configuring can prepare a context of the speech application for evaluating the new code section. For example, the new code section can be a new interactive voice response feature extending from an already existing feature. The step of configuring the path can include satisfying path conditions to access the already existing feature. The method can further include looping around the new code section to continuously test a subpath. The subpath can be a sequence of prompts connected together for generating a call flow within the speech application. For example, in a call routing application, a graphical call flow builder can configure voice prompts for routing a caller to one of many destinations, and the subpath can be one segment of the call routing path.

In one aspect, the step of detecting a new code section can further include identifying a path to the new code section to be tested within the context. The context can be the environment of the speech application. For example, in a call routing environment, a user can enter a sequence of DTMF or voice responses to follow a path to the new code section. The act of entering in DTMF or voice responses takes the user along a path available within the interactive voice response dialogue system. The step of identifying the path can include collecting the DTMF responses or voice responses for ensuring the path can be traveled for accessing and evaluating the new code section.

In one aspect, the step of configuring the path to the new code section can include assigning values to prompts along the path, and making a transition along the path to reach the new code section. For example, a graphical call flow builder can include a call flow diagram with voice prompts configured to provide various call routes. The voice prompts can contain guard variables capable of taking on different values to route the call to various destinations. The step of assigning values can include assigning DTMF responses or voice responses to the prompt values. The guard variables can be set to appropriate grammar values for reaching the new code section based on the context. The step of making the transition routes the call flow through the voice prompts along the path to the new code section. In this way, the method prepares a configuration and isolates the new code section to evaluate a functionality of the new code section within a context of the speech application.

In another aspect, the method can further include publishing the speech application to a configured test server, and running a test harness within the speech application. The configured test server can provide test examples to the test harness for evaluating the functionality of the new code section. The configured test server can provide performance results describing the functionality of the new code section.

In one embodiment a system for testing a section of a speech application is provided. The system can include a test harness configured to test a new code section from within a context of the speech application, and a test controller for transitioning to the new code section. The test controller can run the test harness within the speech application to evaluate a functionality of the new code section. In one arrangement, the test harness can associate a subpath with the new code section. For example, the subpath can be a portion of a path within a call flow diagram of a graphical call flow builder application, such as a sequence of voice prompts configured for a new call route. The speech application can contain at least one path describing a call flow, and the path can be represented by a sequence of prompts graphically connected together in a graphical call flow builder application. The test harness can detect a new path within the graphical call flow builder or it can detect a piece of new code added to the speech application.

In one arrangement, the test harness can assign values to prompts encountered along a path to the subpath for directing a call flow to the new code section of the subpath. For example, the test harness sets guard variables to appropriate grammar values within the prompts thereby configuring a path for reaching the new code section. The test controller will follow the configured path to the new code section for evaluating the new code section functionality within the context of the speech application. The step of configuring the path can include satisfying path conditions for directing the call flow to the new code section.

In one arrangement, the system can further include a publisher for submitting the speech application to a configured test server. The configured test server can provide test examples to the test harness for evaluating the functionality of the new code section. The test controller can run the test harness within the speech application on the configured test server. The test controller can further include a looping mechanism to provide repeated testing of the new code section. The looping mechanism can provide for re-testing of the subpath associated with the new code section.

In one embodiment, the system can additionally include a test entry on a drop-down menu list for testing the new code section. For example, a developer can be adding a new call routing feature to a graphical call flow builder application. The developer can add new voice prompts to direct the call flow to the new feature. The graphical call flow builder can incorporate the test entry on a drop-down menu list for testing the most recent section of code. Upon the user activating the test entry, the system commences execution of the test controller for evaluating the functionality of the new subpath and the new code section. In another arrangement, a user can specify through a wizard two points on a path, identifying the code section to be tested. For example, the developer can point and click to an entry prompt and an exit prompt for defining the subpath to be tested. The wizard can access the subpath in view of the identified entry prompt and exit prompt.

In another aspect, a method for generating a test file from within a speech application is presented. The method can include identifying a new subpath to be tested within the speech application, detecting a path to the subpath, satisfying a path condition along the path for providing a transition, and inserting the subpath and the configuration into the test file. The method can additionally include generating a loop around the subpath for repeated testing. The test file can evaluate a functionality of the new code section by repeating a testing of the subpath.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

Embodiments in accordance with the invention can include a new method and system for testing new code within a speech application. A test file can be automatically generated to verify the functionality of a new section of code presented within a graphical call flow builder application (which is a speech based integrated development environment). The test file can configure a path to the new code and automatically assign predetermined values to call flow prompts along the path. In this manner, the new code section is reached under the same path conditions for allowing repeatable testing. The setting of the path configuration allows for testing of the new code section to commence at a repeatable entry point. The testing can validate the functionality of the new code section. For example, the test file can evaluate a catch event strategy, the audio quality, and the grammars of the new code section within the context of an integrated speech development environment, without having to exercise all possible call flows up to the new code section. This allows for isolated testing of the call flows within the new code section, or subpath, within the context of the speech application.

A publisher can be included to submit the speech application to a test server for running validation tests. The test server can provide test examples, such as DTMF or voice responses, to a test harness for evaluating the functionality of the new code section. A test controller can be employed to set the path configuration and to validate and present results. For example, the test server can simulate DTMF or voice responses to determine the functionality of the new code section within the context of a call flow application. The method and system provide a means for testing the most recent code sections without having to run a full evaluation of the entire speech application.

Figure 1:
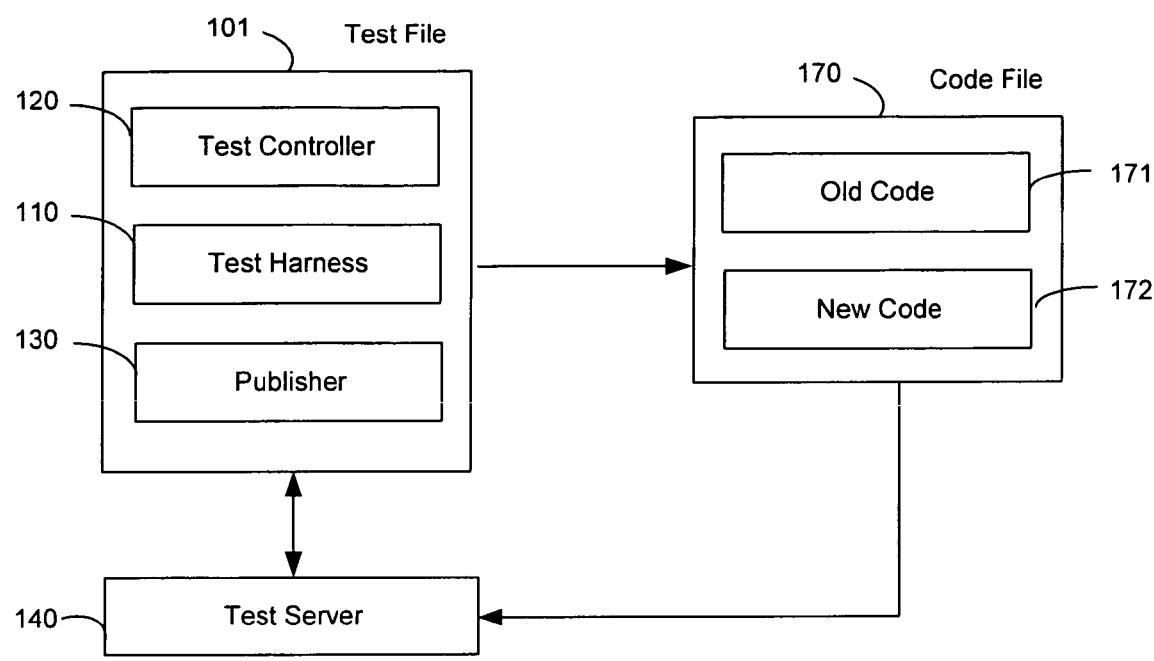
FIG. 1 is a schematic diagram showing a system for testing a speech application in accordance with one embodiment of the invention.

FIG. 1 shows a system 100 for testing a section of a speech application. The system 100 can include a test harness 10 configured to test a new code section 172 from within a context of a speech application, and a test controller 120 for transitioning to the new code section 172 and running the test harness 10. The speech application can be written in code and stored within a code file 170. The code file 170 can contain an old code section 171 and a new code section 172. The new code section 172 can correspond to a new section of code added by a developer, or by an integrated development environment action. The test harness 10 can distinguish the old code section 171 from the new code section 172 to create a harness around the new code section 172. The controller 120 can prepare the test harness 110 around the new code 172 by satisfying conditions for the old code 171. For example, the new code 172 can rely on a completed execution of the old code 171. The test controller 120, can configure the code file 170 such that the conditions are satisfied to allow isolated testing of the new code section 172 within the test harness 110.

The system 100 can additionally include a publisher 130 for submitting the code file 170 to a configured test server 140. In one embodiment, the code file 170 represents the speech application and the test server 140 runs the code file 170 for testing the speech application. The test controller 120 can run the test harness 110 within the context of the speech application on the configured test server 140.

Figure 2:
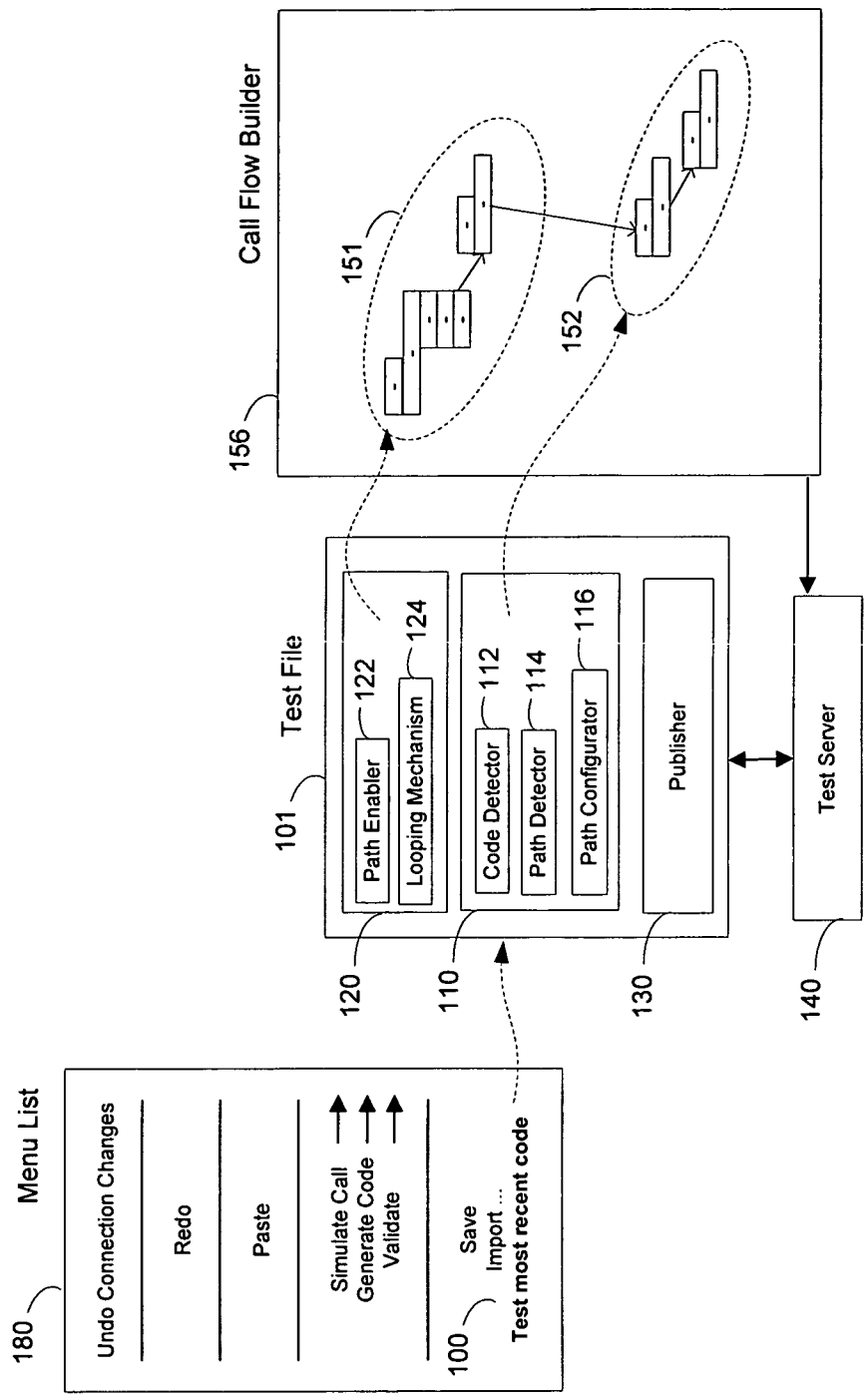
FIG. 2 is a schematic diagram showing a system for testing a speech application in accordance with one embodiment of the invention.

Referring to FIG. 2, system 200 of the system 100 for use with a graphical call flow builder (GCFB) application is shown. The system 200 can include a GCFB application 156 and a menu list 180 within the graphical call flow builder 156. The GCFB 156 can present the menu list 180 which can include an entry into the menu list 180 for "testing most recent code". A developer can select this entry for running the system 100 within the GCFB 156 environment. Detailed components of the test file 101 are also presented. The test harness 110 can include a code detector 112, a path detector 114, and a path configurator 116. The code detector 112 can detect a new subpath 152 added to the graphical call flow builder 156 for identifying the corresponding new code 172. For example, a developer can assemble visual components within the GCFB 156 to generate code. Referring to FIG. 2, the new subpath 152 corresponds to the new code 172 of FIG. 1. The path detector 114 can detect the path 151 leading up to the corresponding new code section 172 of the new subpath 152. The path configurator 116 can collect the path conditions necessary to travel along the path 151 to reach the new subpath 152 corresponding to the new code section 172. For example, a graphical call flow builder 156 can contain at least one path describing a call flow as a sequence of prompts graphically connected together within a visual diagram. The new subpath 152 can be connected to, or be a part of, the already existing path 151. The path configurator 116 can determine appropriate grammar values along the path 151 to determine the call flow sequence to reach the new subpath 152.

The test controller 120 can include a path enabler 122 and a looping mechanism 124. The path enabler 122 can set prompt values along the path 151 for directing a call to the new code section 172 of the subpath 152. For example, the test controller 120 can transition to the new code section 172 by satisfying the path conditions using the call flow sequences collected by the path configurator 116. The looping mechanism 124 can set a loop around the new code section 172 to continuously test the subpath 152.

For example, the speech application can be built or rendered in a graphical call flow builder 156 for a call routing application. The looping mechanism 124 can provide a repeated testing of the new subpath and corresponding code section 172 from within the test server 140. The configured test server 140 can provide test examples to the test harness 110 which can evaluate the functionality of the new code section 172. For example, the test server 140 can provide DTMF tone sequences or voice responses to test the new code section 172, i.e. subpath 152. The test controller 120 can provide a performance result of the testing conducted on the test server 140. The test server 140 can evaluate a functionality of the new code section 172 associated with the test harness 110 within the context of a graphical call flow builder application 156, where the context can be the environment of the speech application, such as a current state of a call routing application.

As another example, within the graphical call flow builder application 156, a developer can add a new feature, such a new call route, to an already existing feature. The developer can directly write the new feature in code 172, or the developer can add a subpath 152 to graphically represent the new feature. The new feature can be added onto an already existing path 151 within the graphical call flow builder 156. The developer can connect a series of voice prompts within the graphical call flow builder 156 to generate the new subpath 152 that extends from the current path 151. The test harness 110 can associate the graphical subpath 152 with the new code section 172 and create a testing environment around the subpath 152. The test controller 120 can handle the configuration of the path 151 leading up to the subpath 152 for ensuring repeatable evaluation.

Figure 3:
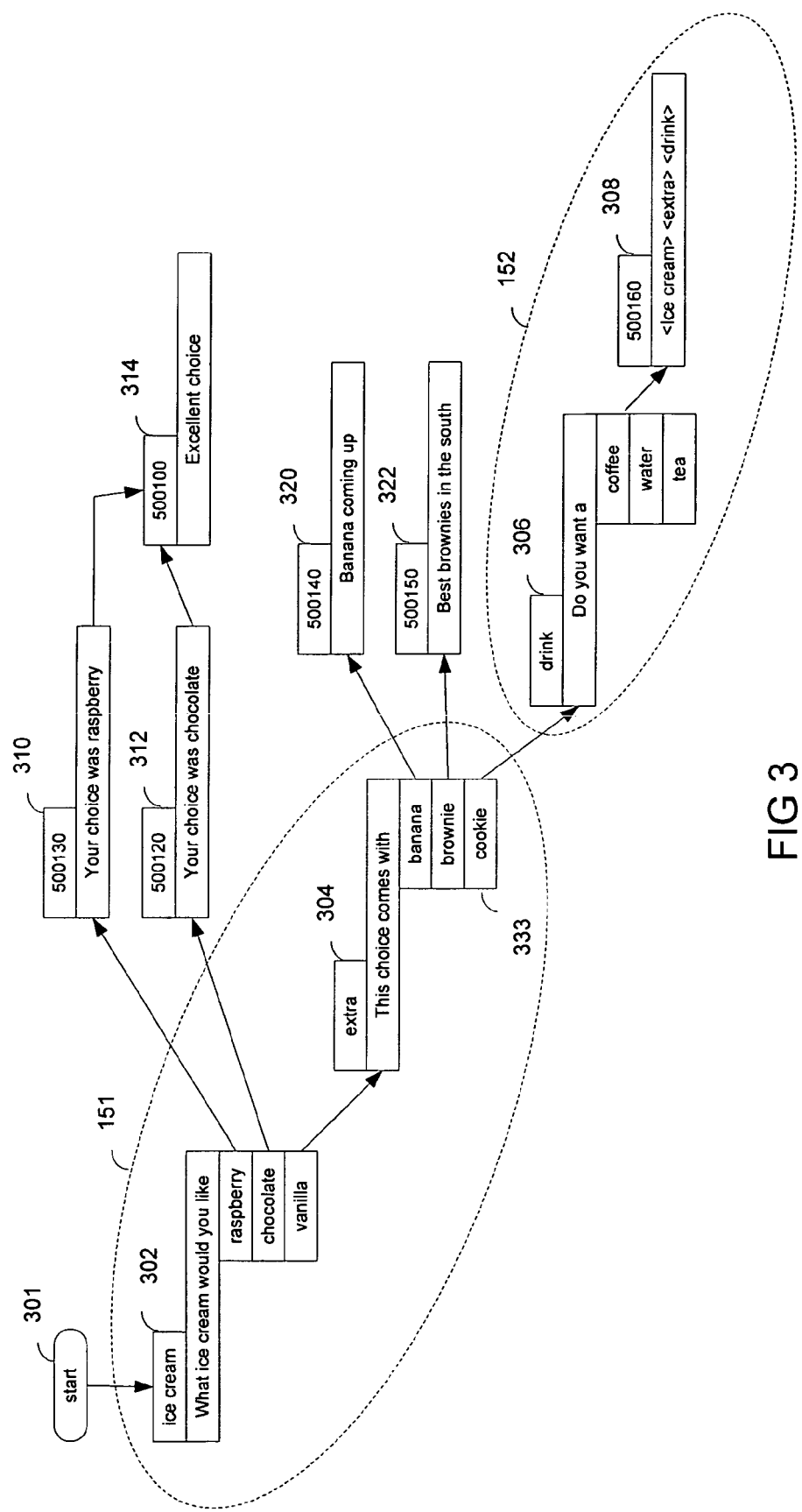
FIG. 3 is a flowchart of a graphical call flow builder for an integrated voice response (IVR) application in accordance with one embodiment of the invention.

Referring to FIG. 3, a call flow system 300 for an interactive voice response (IVR) example is shown. The call flow system 300 can be created using a graphical call flow builder which is a speech integrated development environment. The call flow system 300 consists of numerous voice prompts for routing a call to a particular destination or service. The voice prompts can individually direct a call to other voice prompts or to an end-service based on a caller response. For example, a caller can call into an IVR for ordering ice-cream. The user can select a flavor of ice cream along with other items that may be of interest during the purchase. Each prompt can contain a guard variable that describes the list of entries recognized by the prompt. The guard variable assumes one of the list entries to direct the call flow based on a caller's response.

For example, the first voice prompt 302 has an associated guard variable "ice cream" with a list of entries: raspberry, chocolate, and vanilla that can serve as the value to the guard variable. The prompt 302 can present a spoken utterance to the caller asking "what ice cream would you like?". The prompt 302 can be configured to recognize one of three flavors: raspberry, chocolate, or vanilla which the caller can select via a voice response. The prompt can actively present the list of choices to the caller by playing audio or through a menu display. The prompt 302 can interpret the caller's response and direct the call to a second prompt depending on the caller's flavor choice. The prompt can receive voice responses or DTMF tone sequences for directing the making of the selection. For example the user can elect 'vanilla', by saying vanilla or entering a DTMF tone sequence corresponding to the vanilla list entry. The prompt 302 can interpret the caller's response and set the guard variable "ice cream" to 'vanilla'. Referring to FIG. 3, the call will then be directed to a second prompt 304 that can present a further choice, such as "this choice comes with the following extra items" with the list of extra items: banana, brownie, or cookie. If the user elects 'cookie' the prompt 304 assigns the guard variable 'extra' to the value 'cookie'. Additional prompts can be added to extend the service offering each with a new prompt containing a list of choices for directing the call flow.

Figure 4:
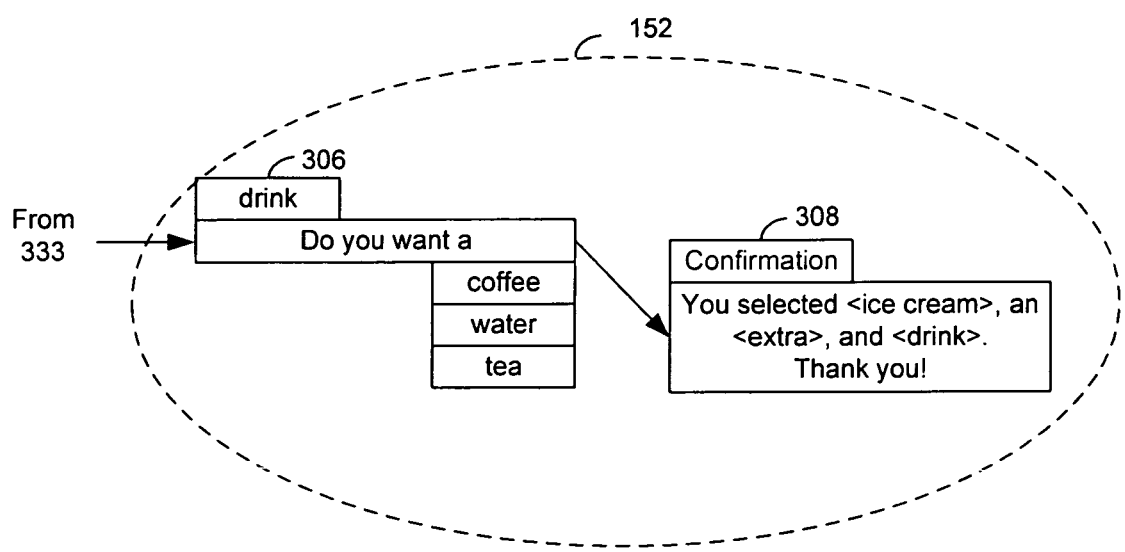
FIG. 4 is a flowchart extension of the flowchart of FIG. 2 showing a new subpath in accordance with one embodiment of the invention.

For example, referring to FIG. 4, the call flow system 300 can be expanded to include a new subpath 152 resulting in an extended call flow system 400. For example, a developer can add a new subpath 152 to the call flow system 300 for extending the service offering. The new subpath 152 can be represented by the new prompt 306 and statement 308 with new connections made within the call flow system 400 for providing the extended service. For example, the subpath 152 represented by prompt 306 and statement 308 is an extension of the path 151 represented by prompts 302 and 304. The developer can add prompt 306 to expand the service offering along path 151. Notably, reaching the new prompt 306 requires satisfying the conditions of path 151 leading up to the new subpath. For example, the prompt 306 depends on the side item choice made at prompt 304. Accordingly, the prompt 304 depends on the flavor choice made at prompt 302. If the caller responds with a 'vanilla' choice followed by a 'cookie' choice, the prompt 306 can provide another offering such as "do you want coffee" with a list of choices: coffee, water, or tea. The prompt 306 has the guard variable 'drink', which when filled, will lead to statement 308, announcing the selections made by the user.

Figure 5:
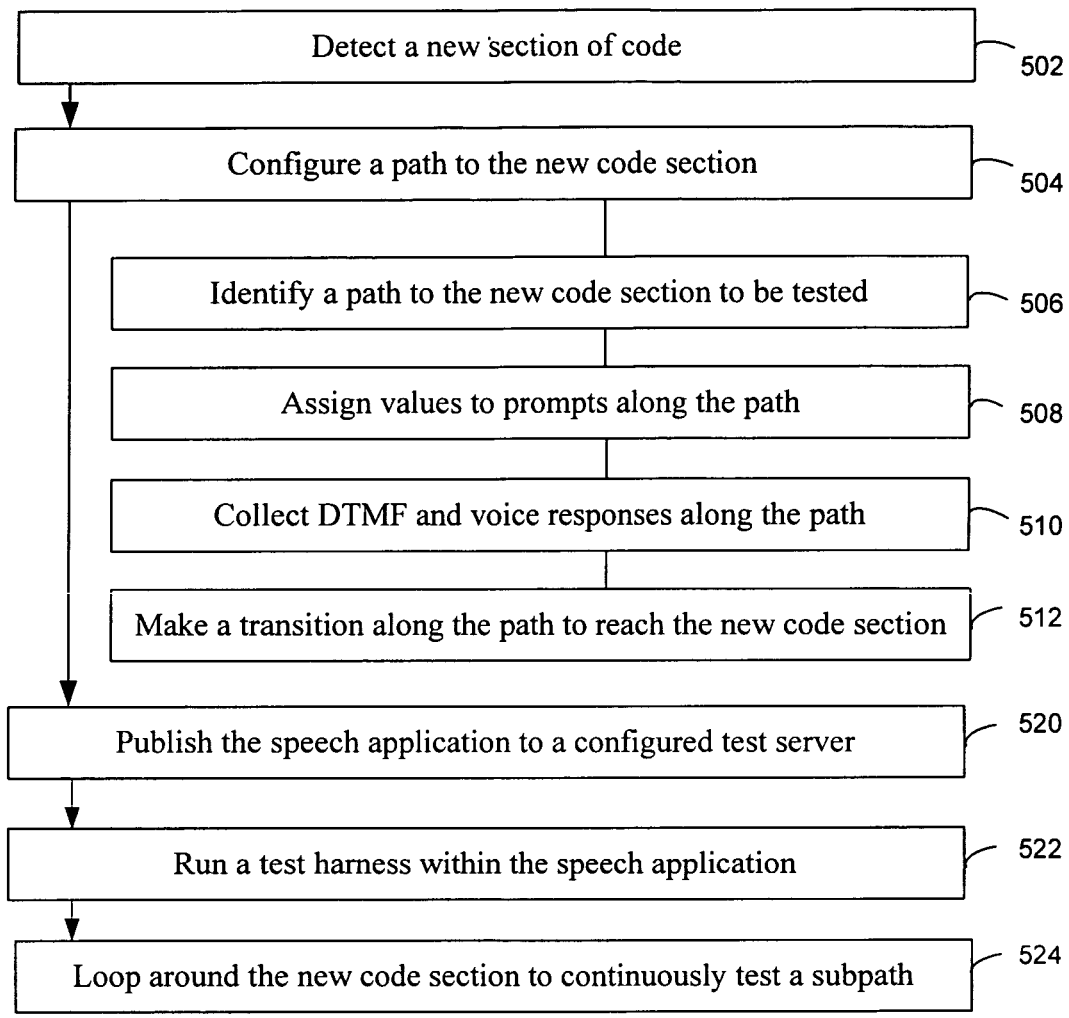
FIG. 5 is a flowchart illustrating a method for testing a portion of a speech application in accordance with one embodiment of the invention.

Referring to FIG. 5, a method 500 is shown for testing a portion of a speech application, such as a new subpath within the call flow system 300. When discussing FIG. 5, reference will be made to FIGS. 2 and 3 for associating the system 100 components with the call extended flow system 400 for describing the enabling means. Notably, the method 500 can be practiced in a suitable system or device capable of realizing the methods but is not limited to the particular order in which they are presented in FIG. 5. The method 500 is capable of testing new sections of code as well as already existing sections of code specified by the developer. The method 500 can also have a greater number of steps or a fewer number of steps than those shown in FIG. 5

At step 502, a new section of code can be detected. For example, referring to FIGS. 1 and 3, the subpath 152 recently added by a developer represents a new section of code 172. The test harness 110 determines that a new subpath 152 has been added to the call flow system 300. The code detector 112 determines the new section of code 172 corresponding to the new subpath 152. In one arrangement, the test harness 110 provides version control to determine when a speech application is edited or modified. Alternatively, a developer graphically selects a subpath by specifying endpoints around the subpath for identifying the subpath desired to be tested. For example, referring to FIG. 4, a developer selects prompt 306 and statement 308 to identify the new subpath 152.

At step 504, a path to the new code section can be configured. For example, referring to FIGS. 1 and 3, the path detector 114 of the test harness 110 determines the path 151 leading up to the new subpath 152. The step 504 of configuring the path can include sub-steps 506-512.

For example, at step 506, a path to the new code section can be identified. Referring to FIGS. 2 and 4, the path detector 114 evaluates the sequence of the prompts within the call flow system 300 for identifying which prompt are traveled along the path 151. For example, the path detector 114 identifies prompts 302 and 304 as belonging to path 151 which lead up to the subpath 152.

At step 508, values can be assigned to prompts along the path. For example, referring to FIGS. 2 and 3, the path configurator 116 determines the sequence of events along the path 151 necessary to reach the subpath 152. For example, the correct sequence of conditional events along the path requires the caller to select a 'vanilla' flavor choice with a 'cookie' side item extra choice. The path configurator 116 recognizes the correct sequences of choices and sets the guard variables of the prompts to the appropriate grammar value. For example, the guard variable 'ice cream' for prompt 302 is set to 'vanilla', and the guard variable 'extra' for prompt 304 is set to 'cookie. The path configurator 116 sets the guard variables within the underlying code of the speech application created by the call flow system 400.

In one arrangement, at step 510, the path configurator 116 establishes the path conditions by collecting the DTMF tone sequences and voice responses necessary to actually activate the prompts along the path to the new code section. For example, the test harness 110 can travel along the path 151 by simulating the caller's responses for making the choices 'vanilla' and 'cookie' using DTMF tone sequences or voice responses.

At step 512, a transition along the path to reach the new code section can be made. Referring to FIGS. 2 and 3, the path enabler 122 of the test controller 120 activates the prompts along the path 151 to the new subpath 152 using the path defined by the path detector 114. To make the transition to the new subpath 152, the path enabler 122 activates the prompts using the grammar values determined by the path configurator 116 of the test harness 110. For example, the path enabler 122 feeds the value 'vanilla' to the 'ice cream' guard variable of prompt 302 to route the call flow to prompt 304, at which point the path enabler 122 feeds the value 'cookie' to the 'extra' guard variable of prompt 304 to route the call flow to the new subpath starting at prompt 306. Alternatively, the path enabler 122 feeds simulated DTMF sequence tones and voice responses for traveling along the path 151 up to the subpath 152 which were previously collected by the path configurator 116.

At step 520, the speech application can be published to a configured test server. For example, referring to FIG. 3, the call flow system 300 represents an IVR speech application that can be compiled and published to an external web server that is capable of supporting and running the IVR speech application. For example, referring to FIG. 1, The publisher 130 submits the speech application generated by the call flow system 300 to the configured test server 140. The test controller 120 controls the evaluation on the test server 140 and coordinates interaction between the test harness 110 and test server 140. The test controller 120 processes the results and provides a performance measure to the developer. Referring to FIG. 2, the test controller 120 can submit the performance result to the menu list 180 which presents the results to the user.

At step 522, the test harness can be run. For example, referring to FIG. 1, the test controller 120 runs the test harness 110 on the configured test server 140 within the environment of the speech application. The configured test server 140 provides test examples to the test harness 110 for evaluating the functionality of the new code section 172. For example, the test controller 120 prepares the path configuration 151 using the path enabler 122 to make the transition to the entry prompt 306 of the subpath 152. The path enabler 122 activates the prompts 302 and 304 along path 151 thereby reaching the subpath 152 to be tested. The test controller 120 passes test examples from the test configuration server 140 to the test harness 110. The test examples can be DTMF tone sequences or voice responses for simulating the functionality of the new path. For example, the test controller 120 passes prerecorded voice responses from a voice database available to the test server 140. The database can include multiple talkers with different dialects and accents saying voice responses such as 'coffee', 'tea', 'milk' and the like. The test controller 120 can present voice response inputs which match the grammar values of the voice prompt or which do not match for evaluating a recognition performance. The test controller 120 provides a comprehensive testing of the new code section by testing many different test examples. The test controller 120 can additionally simulate DTMF tone sequences for making a choice within the prompts or can test with audio generated through the text-to-speech engine, or with plain text.

Referring back to FIG. 5, at step 524, a loop can be created around the subpath to continually test the code when the test harness is being run. For example, referring to FIG. 2, the test controller 120 includes the looping mechanism 124 and repeats testing of the subpath 152. For example, referring to FIG. 4, the looping mechanism 124 generates a loop back to the 'drink' prompt 306 after the test harness 110 plays the 'condiment' statement 308. The looping mechanism 124 generates a loop around the prompt 306 and statement 308 which corresponds to the newly added subpath. During validation runs on the test server 140, the path enabler 122 enables the path to the new subpath for each loop, and the looping mechanism 124 loops around the new subpath to continuously test the subpath. The path enabler 122 and looping mechanism work together with the test server 140 to configure the path within the speech application prior to running each loop.

In one arrangement, the method 500 can be activated by a user selecting an option to test new code within the call flow building application. For example, referring to FIG. 2, a menu list 180 within the graphical call flow builder IDE can include an entry into the menu list 180 for "testing most recent code". The developer, upon adding a new subpath to the diagram, selects the entry in the menu list from a drop-down menu 180 within the IDE to test the new section of code and generate a test file 101 in accordance with the steps of method 500. The menu list 180 generates a test file for automatically testing the new code section and presenting validation results. Alternatively, the menu list 180 supports a wizard feature for the developer to graphically identify the subpath. The developer graphically selects two endpoints of the subpath for the wizard to identify the code section to be tested. For example, the developer selects prompt 306 and statement 308 and the wizard identifies these as subpath 152. The test file 101 runs the speech application on the test server 140, evaluates the functionality of the new code, and provides real-time results to the developer. Alternatively, the developer runs the test file at a later time or save the test file. For example as shown below the test file 101 repeatedly evaluates the subpath 152 during a testing loop.

500 Test Server: Do you want coffee, water, or tea?
502 User: coffee
504 System: You selected vanilla ice cream, a cookie, and coffee. Thank You!.
506 Test Server: Do you want coffee, water, or tea?
508 User: water
510 System: You selected vanilla ice cream, a cookie, and water. Thank You!.

The present invention also may be embedded in a computer program product, which comprises all the features enabling the implementation of the methods described herein, and which when loaded in a computer system is able to carry out these methods. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method executed by a processing unit for testing computer executable software code of a speech application, the speech application containing at least one path describing a call flow, the at least one path represented as a sequence of prompts graphically connected together, the method comprising acts of:

detecting a new code section of computer executable software code which has not been previously validated by execution of an evaluation process;
associating a subpath specified by a developer with said new code section, wherein the subpath is a portion of said at least one path;
identifying a first path through the speech application to said new code section;
configuring the first path to said new code section, wherein the act of configuring comprises automatically assigning a value to one or more variables associated with one or more prompts along said first path, and making a transition to said new code section;
generating a test file for automatically testing said new code section based on a test entry on a drop-down menu list, wherein the drop-down menu includes a wizard feature for graphically identifying the subpath; and
executing the test file to evaluate the new code section, wherein the act of executing the test file comprises providing one or more test examples in response to at least one prompt of the new code section, and evaluating at least one functionality of the new code section based on a response of the new code section to the one or more test examples.

2. The method of claim 1, further comprising looping around said new code section to continuously test the subpath, wherein said subpath is a sequence of conditional events directing a call flow within said speech application.

3. The method of claim 1, wherein the act of assigning values comprises collecting Dual Tone Multi-Frequency (DTMF) responses along said first path to said new code section.

4. The method of claim 1, wherein said method isolates said new code section for evaluating at least one functionality of said new code section by satisfying a path condition of said speech application.

5. The method of claim 1, further comprising:
publishing said speech application to a configured test server; and
running a test harness on said configured test server, wherein said configured test server provides the one or more test examples to said test harness for evaluating the at least one functionality of said new code section.

6. The method of claim 1, wherein the act of assigning values comprises collecting voice responses along said first path to said new code section.

7. A computer-implemented method for generating at least one test file for a speech application, the speech application containing at least one path describing a call flow, the at least one path represented as a sequence of prompts graphically connected together, the method comprising:

identifying a new code section to be tested within said speech application, wherein said new subpath code section has not been previously validated by execution of an evaluation process;
associating a subpath specified by a developer with said new code section, wherein the subpath is a portion of said at least one path;
detecting a first path to said new code section;
establishing at least one path condition for the first path that corresponds to a configuration of the speech application, wherein the first path provides a transition to said new code section, wherein establishing at least one path condition for the first path comprises automatically assigning a value to one or more variables associated with one or more prompts along said first path; and inserting said subpath and said at least one path condition into said test file,
wherein generating at least one test file for the speech application is based on a test entry on a drop-down menu list, wherein the drop-down menu includes a wizard feature for graphically identifying the subpath.

8. The method of claim 7, further comprising:
publishing said speech application to a configured test server;
generating a loop around said subpath; and
running said speech application in accordance with said test file, wherein said test file evaluates at least one functionality of said new code section by repeating testing of said subpath, as determined by said loop.

9. A system for testing computer executable software code for a speech application, the speech application containing at least one path describing a call flow, the at least one path represented as a sequence of prompts graphically connected together, the system comprising:
a test harness configured to:
detect a new code section added to said speech application, wherein the new code section has not previously been tested by an evaluation process;
associate a subpath specified by a developer with said new code section, wherein the subpath is a portion of said at least one path;
identify a first path through the speech application to said new code section;
provide one or more test examples to at least one prompt of the new code section; and
evaluate at least one functionality of the new code section of computer executable software code which has not been previously validated by the evaluation process;
a test server comprising at least one processor configured to run said test harness;
a test controller configured to:
configure the first path to said new code section by automatically assigning a value to one or more variables associated with one or more prompts along said first path to satisfy a path condition, and making a transition to said new code section; and
run said test harness on said test server, wherein said test harness evaluates the at least one functionality of said new code section; and
a test entry on a drop-down menu list for generating a test file for automatically testing said new code section, wherein said drop-down menu includes a wizard feature for graphically identifying the subpath.

10. The system of claim 9, wherein said test harness determines appropriate grammar values along the first path leading to said new code section.

11. The system of claim 9, wherein the test controller assigns values to one or more guard variables within prompts along the first path, said guard variables directing a call flow to said new code section.

12. The system of claim 9, further comprising a publisher for submitting said speech application to said configured test server; and,
said configured test server provides the one or more test examples to said test harness for evaluating the at least one functionality of said new code section.

* * * * *